United States Patent
Navarra Pruna

(10) Patent No.: US 6,457,968 B1
(45) Date of Patent: Oct. 1, 2002

(54) EXPANDABLE EJECTOR FOR INJECTION MOULDS

(76) Inventor: Alberto Navarra Pruna, 8, calle Juan Ramon Jimenez, 08960 Sant Just Desvern (ES)

( * ) Notice: Subject to any disclaimer, the term of this patent is extended or adjusted under 35 U.S.C. 154(b) by 0 days.

(21) Appl. No.: 09/760,793

(22) Filed: Jan. 17, 2001

(51) Int. Cl.⁷ .............................................. B29C 45/44
(52) U.S. Cl. ................. 425/556; 425/444; 425/DIG. 58
(58) Field of Search ............................. 425/436 R, 444, 425/556, DIG. 58

(56) References Cited

U.S. PATENT DOCUMENTS 5,630,977 A * 5/1997 Catalanotti et al. ......... 425/556

* cited by examiner

*Primary Examiner*—Tim Heitbrink
(74) *Attorney, Agent, or Firm*—Sughrue Mion, PLLC

(57) ABSTRACT

An expandable ejector for injection moulds. The ejector includes a single-piece body in which a cylindrical rod (1) is defined, which, after a weakening portion (3) ends in an expandable head (2), by way of a pincer, centering its features on the fact that the head (2) adopts a configuration which is also cylindrical, coincident in diameter with that of the rod (1), allowing for easy machining of the ejector as well as the mould itself, in which an orifice which is also cylindrical and of constant section in its entire length will be necessary. The pincers of the head (2), after their obtainment, adopt, in a stable form, a divergent position, by a suitable thermal treatment, so that they close when the head penetrates the mould body and open automatically when the head (2) frees itself of the mould body and reaches the inside of the same. In the head (2) cavity, in correspondence with the confluence zone between the cuts which convert it into a pincer, a housing (9) coincident in shape and dimensionally with the negative to be obtained is established.

6 Claims, 1 Drawing Sheet

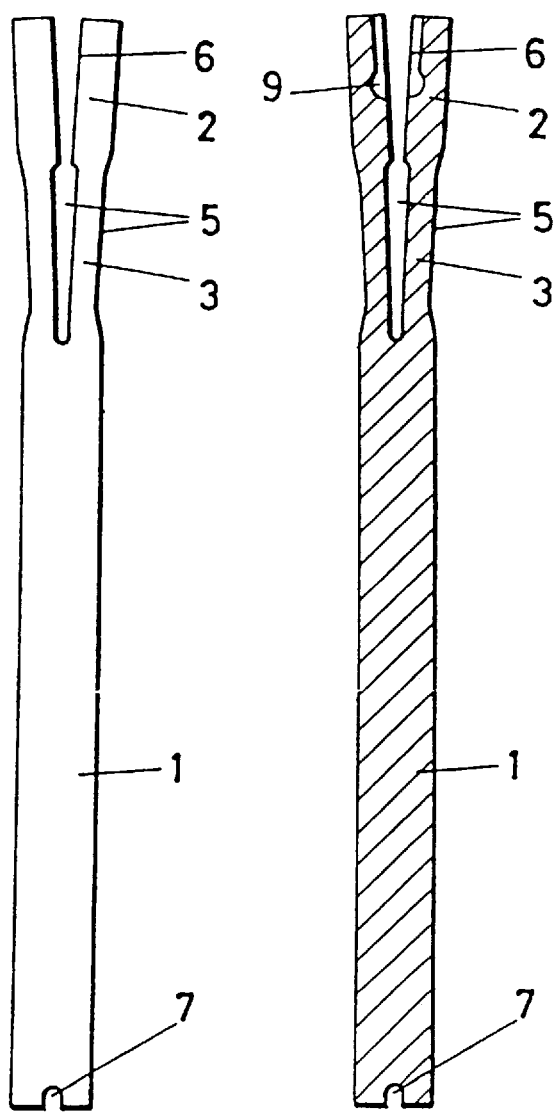
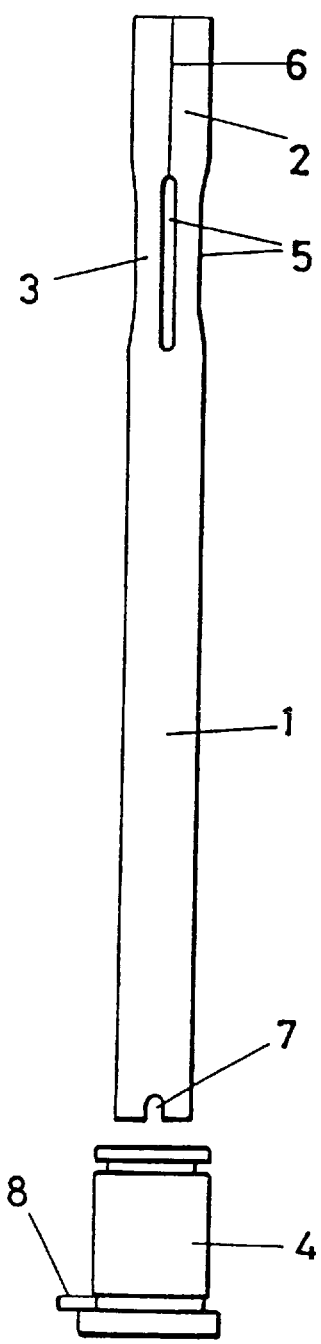
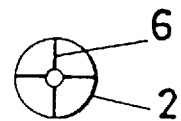

EXPANDABLE EJECTOR FOR INJECTION MOULDS

OBJECT OF THE INVENTION

The present invention refers to an ejector, of the kind used in plastic injection moulds, aluminium, bakelite or any other material, and which, parallel to its function as such, is conceived of as a complement moulder of small negatives, allowing for an easy mould release of such negative zones at the same time as it facilitates the extraction of the part to obtain in the mould cavity.

BACKGROUND TO THE INVENTION

When it comes to moulding a specific part it is frequent that in the same recesses or orifices exist, that is to say "negatives" which would make the mould release impossible with regard to the utilization of single-piece semi-moulds, for which it is necessary to resort to progressive moulds in which different parts of the same are movable in different directions, with the aim of freeing the negatives from the part to be obtained.

This entails the need to use bulky moulds, expensive to carry out and maintain, and with a poor performance in view of the slowness of the mould release.

Trying to obviate this problem the applicant himself is the holder of Spanish utility model U 95021186, in which a mould-ejector accessory for injection moulds is described, which turns out to be particularly ideal in the case of relatively small negatives as, being conveniently implanted in the corresponding mould cavity in the right number and configuration, it practically takes up the space of conventional ejectors, operating like them and bringing about the freeing of the negatives in the ejection manoeuvre itself of the part to be obtained.

More specifically, such accessory is structured with an elongated steel body, in which a rod equipped with fixing means to the ejecting plate and which resembles a conventional ejector, through a flat and elastically deformable neck connects to a head which plays in a housing formally and dimensionally coincident with it, operatively established in the mould, this latter head being affected by a recess in the material in turn adapted formally and dimensionally to one of the small negatives which participate in the part to be obtained.

Thus, at the end of the injection phase in the ejecting plate movement itself, as well as the conventional ejector being dragged, so are the accessory or accessories integrated to the mould, so that parallel to the pushing movement on the moulded part, its head leaves the corresponding mould housing, automatically generating a side deformation of said head which gives rise to the freeing of the corresponding negative.

This solution, while it is totally acceptable from a theoretical point of view, in practice presents problems which centre fundamentally on two aspects:

The parts to be machined, both the moulder-ejector accessory and the mould are formally complex, as the head of the accessory is over-sized with regard to the constituent sector of the rod and moreover adopts a configuration which is detached from the cylinder, the configuration having to be extended to the mould itself, which obviously entails complex machining operations.

As a result of the complexity of shapes mentioned it is difficult to achieve a perfect fitting between the moulder-ejector accessory and the mould itself, with the risk of the mould material penetrating the interstices generated among these elements, which makes the parts to be obtained defective, causing the mould's deterioration which has to be periodically disassembled for cleaning.

Expandable ejectors are also known with the same complementary moulding function, whose head configures as a frusto-conical of a double conicity pincer, with diametric cuts which allow the same to expand and in the cavity of whose cuts the housing for the negative is established, so that in this case the mould body does not take part in the conformation of said negative, but the manufacturing processes of these conic sections are also very costly, and also the help of a bushing which, conveniently implanted in the mould, works as a guide and closing component for the moulder-ejector head.

In the Spanish application for utility model number 9103746, of the same holder, a fastening head is described therein for ejectors and tubings in injection moulds, and more specifically the special structuring of said head, with which a quick assembly and disassembly of the ejector itself is feasible, as well as a perfect fixing of the same, both in axial direction and angular direction, in operative condition.

DESCRIPTION OF THE INVENTION

The expandable ejector that the invention proposes satisfactorily solves the problem previously explained, determining, parallel to an optimum functioning, a clear simplification in its constructive process, with the consequent reduction in cost that it entails.

For this and in a more specific way said expandable ejector centres its features on the fact that its head is cylindrical and coincident in diameter with the majority sector of the same constituent of the rod which by its free end receives the ejector base.

Thus the mould housing for the ejector is perfectly cylindrical, which entails an extremely simple machining process, and the expandable ejector is obtained starting from a steel rod, also cylindrical, in which it is only necessary to make the cuts of its head to achieve the pincer effect in its subsequent tempering, and the side recesses to facilitate the elastic deformability of said pincer, which are also obtained in the extremely simple machining process.

On the other hand, and as it is to do with a cylindrical component and a housing which is also cylindrical, the fitting between both parts is perfect.

The ejector will be marketed only with the cuts in its head, which converts it into a pincer, each user being the one who makes the drawing in negative in the inside of said head corresponding to the practical use intended for the ejector. Furthermore, the ejector will also be supplied over-sized in length, as its coupling to the ejector base permits the surplus sector in each case to be cut from the corresponding end, also for the ejector as a whole to suit the specific demands of every user.

Thus structured, the expandable ejector can function perfectly well without the classical bushing-guide, but may optionally be assisted by said bushing in order to avoid wearing away in the mould produced by friction.

DESCRIPTION OF THE DRAWINGS

To complement the description which is being given and with the aim of helping towards a better understanding of the features of the invention, in accordance with a preferred example of a practical embodiment of the same, as an integral part of said description, a set of drawings is accompanied wherein the following have been shown by way of unrestricted illustration:

FIG. 1. Shows, in accordance with a diagrammatic side elevation representation, an expandable ejector for injection moulds made in accordance with the object of the present invention, which appears facing its corresponding ejector base and with its pincer closed as obtained following the machining phase.

FIG. 2. Shows an axial view of the ejector of the previous figure at its end corresponding to the pincer or head.

FIG. 3. Shows, also in accordance with a side elevation view, the same combination of the previous figure duly assembled and with the head or pincer in open position, in accordance with the position it tends towards following its tempering.

FIG. 4. Shows, finally, a transversal section detail of the ejector, with a specific machining corresponding to the obtaining of a determined negative.

PREFERED EMBODIMENT OF THE INVENTION.

Viewing these figures it can be observed how the expandable ejector that the invention proposes materializes, like any other conventional ejector of this type, in a single-piece body in which a cylindrical rod (1) is defined, a head (2) determinant of an expandable pincer and an intermediate and weakened zone (intermediate sector) (3) facilitating the deformability of aforementioned pincer (2), but with the special peculiarity in the present case that the repeatedly mentioned pincer also adopts a cylindrical configuration whose diameter is exactly coincident with the majority sector of the rod (1) which transmits the movement of the head from the ejector base (4) associated to its other end.

Thus, in accordance with the fundamental objective of the invention and as has previously been said, an ejector is achieved being obtained starting from a steel, cylindrical and constant section rod, whose machining is extremely simple since it does not go further than establishing the necessary recesses (5) to achieve the weakened zone (3) and the necessary cuts (6) so that said head (2) can act like a pincer, cuts which in the practical embodiment example represented in the figures are both diametrical and perpendicular to each other, but whose number may vary without affecting in any way the essence of the invention.

After the obtaining of the ejector in accordance with the representation of FIG. 1, it will undergo a tempering phase so that the pincer tends to permanently adopt the open situation shown in FIG. 3 and, consequently, so that said pincer opens automatically when it leaves the mould housing, perfectly cylindrical.

The coupling of the ejector (1) itself to the ejector base (4) is done by plugging the first into the second, having foreseen that the rod (1) incorporates into the corresponding end to such coupling a diametral mortise or groove (7) on which a pin (8) works crossing the body of the ejector base (4) itself, thus achieving the immobilisation of the ejector in angular direction, so a rapid assembly and disassembly of the ejector itself is feasible, as well as a perfect fixing of same in operative condition, both in axial and angular direction, although such immobilisation may be carried out by any other means.

In any case, this coupling by simple plugging of the ejector (1) itself to the ejector base (4), allows the ejector (1) to be over-sized from origin so that each user may cut it later, fitting its effective length to the specific needs of each specific case.

It will also be the user himself who, subsequent to the acquisition of the expandable ejector, makes the housing (9), adapted in shape and configuration to the negative to be obtained, in its head cavity (2).

In accordance with what was previously shown, the assembly of the ejector (1–2) will be done from the inside of the mould, the fastening of the same to the ejector base will be done on the outside, and the longitudinal regulation of the same will also be done at this end corresponding to the ejector base.

It is not considered necessary to go any further in this description so that any expert in the field understands the scope of the invention and the advantages deriving from the same.

The materials, shape, size and disposition of the elements will be liable to variation provided that it does not entail an alteration in the essence of the invention.

The terms in which this abstract has been worded should always be taken in their broadest and most unrestricted sense.

What is claimed is::

1. An expandable ejector for injection moulds, comprising:
   a single-piece cylindrical rod (1) including:
      a first end adapted for coupling to the ejector base (4),
      a second end which finishes in a head (2) with radially expandable pincers, and
      an intermediate sector (3) between the first and second ends and weakened to facilitate the elastic expansion/retraction of the head, wherein said head (2) adopts in a closed position a cylindrical configuration, coincident in diameter with that of a majority sector of the constituent ejector of the rod (1), so that the mould housing for said ejector also adopts a cylindrical configuration, of constant section throughout its length.

2. The expandable ejector of claim 1, wherein the pincers defined in said cylindrical head (2), in the cutting operation of the same, adopt a divergent positioning after suitable thermal treatment, automatically adopting said divergent position when the head leaves the cylindrical housing of the mould.

3. The expandable ejector of claim 1, wherein in the cavity of the head (2), in correspondence with the confluence axis of the cuts (6) which convert the same into a pincer, housing (9) is established which takes part in the moulding itself and which is formally and dimensionally coincident with the negative to be obtained.

4. The expandable ejector of claim 1, wherein the ejector collaborates with the same a bushing also cylindrical, intended for being provided in the mould at the level of the housing zone of the head (2), the internal diameter of which coincides with the head itself and of suitable features in order to minimize the effects of the friction in the normal operation of the ejector.

5. The expandable ejector of claim 1, wherein said first end couples to the ejector base (4) by simple axial plugging, co-operating in this coupling anti-turn means (7–8) which immobilize the ejector itself in an angular direction.

6. The expandable ejector claim 5, wherein the rod (1) which participates in same is liable to be over-sized from origin in order, prior to its coupling to the ejector base (4), to cut and eliminate from the same the necessary sector for the ejector as a whole to suit the specific needs of each case.

\* \* \* \* \*